June 22, 1937.　　　C. R. GARRIS　　　2,084,799

LAWN MOWER SHARPENER

Filed July 19, 1934

INVENTOR.
CLARK R. GARRIS.

BY

ATTORNEY.

Patented June 22, 1937

2,084,799

UNITED STATES PATENT OFFICE 2,084,799

LAWN MOWER SHARPENER

Clark R. Garris, Seattle, Wash.

Application July 19, 1934, Serial No. 736,061
In Germany September 31, 1933

6 Claims. (Cl. 51—250)

This invention relates to a novel device for sharpening lawn mowers and a method of making the same. More particularly the invention relates to a sharpener of durable but simple construction whereby it can be manufactured easily and at a low cost.

The new sharpening device comprises a relatively rigid backing member consisting of thin metal, for example sheet metal, and a layer of abrasive material carried by the backing. The sheet metal backing preferably comprises a rectangle having one dimension at most equal to the effective length of the rotor of a lawn mower and curved along one edge of that dimension so that it is adapted to removably embrace or engage the shrubbery bar of a lawn mower and position the sharpener to contact tangentially the cutting edges of the rotary blade with the surface of the abrasive layer as the rotor is rotated.

The new sharpener and the method of making it will be further described with reference to the accompanying drawing in which—

Figure 1:
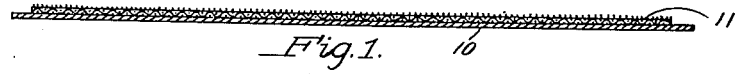
Figure 1 is a transverse section of the device in the first stage of its manufacture.
Figure 2:
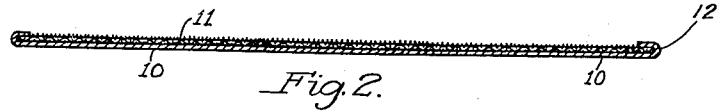
Figure 2 is a transverse section of the device in the second stage of its manufacture.

Referring to the drawing the first four figures illustrate the method of the invention by which the new sharpener is made. A rectangle of sheet metal 10 of suitable dimension and a similar rectangle of abrasive coated fabric 11 of equivalent dimension are placed together whereby they are substantially coincident. The edges corresponding to the length of the rotor are firmly fastened together as by folding back a portion 12 of the sheet metal on the fabric and clamping it down on the main portion of the sheet metal 10, thus firmly holding the fabric 11 between the portions so clamped together.

After the edges are thus joined the sheet metal is curved back on itself along one of the joined edges to approximately 180 degrees and at a radius whereby the curved portion 13 is adapted to embrace or engage the shrubbery bar of a lawn mower and position the sharpener to contact the rotary blade of the rotor.

Figures 3, 4:
Figure 3 is a transverse section of one modification of the completed device.
Figure 4 is a transverse section of a second modification of the completed device.
Figure 5:
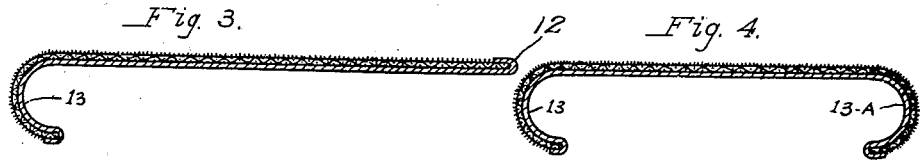
Figure 5 is a perspective view of the modification shown in Figure 4.

The sharpener may be curved adjacent one joined edge as shown in Figure 3 or it may be curved adjacent and parallel both joined edges thus forming two curved portions 13 and 13a, each of which is independently adapted to removably embrace or engage the shrubbery bar and position the sharpener to contact the rotary blade in the proper relation.

Figures 6, 7:
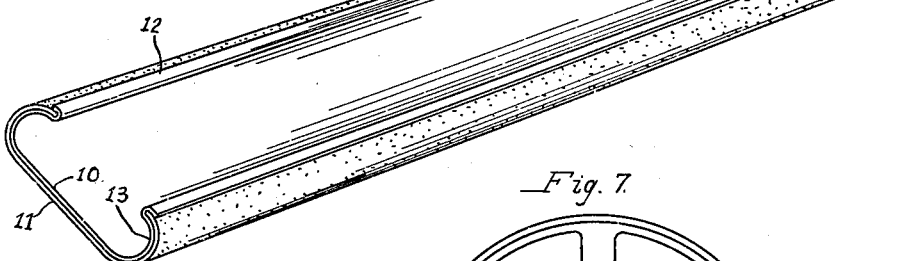
Figure 6 is a transverse section of a lawn mower showing the sharpener of Figure 5 in position in one method of using the sharpener.
Figure 7 is a view similar to Figure 6 showing a second method of using the sharpener.

In the use of the new sharpening device a curved portion is engaged with the shrubbery bar or cross rod 14 of a lawn mower as shown in Figure 6 or Figure 7 whereby the abrasive surface on the flat portion 15 is positioned to contact the cutting edges 16 of the rotary blade as they are rotated about their axis 17. In the modification shown in Figure 6, the sharpener is permitted to hang from the shrubbery bar 14 whereby it will contact the edges 16 of the rotary blade tangentially. The sharpener may be permitted to hang against the cutting edges 16 of its own weight or if a sharpener having two curved portions is used as shown in Figure 6 and Figure 7, suitable weight may be placed in the lower curved portion shown in Figure 6 to press the sharpener more firmly against the cutting edges. With the sharpener in position the rotor is given a number of revolutions by turning the wheels of the mower or otherwise.

The sharpener may also be used according to the method illustrated in Figure 7. In this method the handle of the lawn mower is pushed toward the ground whereby the lawn mower rests entirely upon the roll 18. The sharpener is then engaged with the shrubbery bar 14 so that the remainder of the sharpener extends toward the rear of the lawn mower as shown in Figure 7. In this position the sharpener is held in place by tension and is pressed against the cutting edges 16 of the rotary blade to the degree necessary to properly sharpen the blade. This sharpening operation can be conveniently carried out by the operator of the lawn mower by forcing the handle of the lawn mower to the ground and retaining it in that position by the pressure of one foot, holding the sharpener in one hand in the position shown in Figure 7 whereby it can be held in place and pressed against the blade with the proper pressure, and with the other hand turning the wheels of the lawn mower which are free to rotate and whereby the rotor is rotated to scrape the edges of the blade across the abrasive surface of the sharpener.

The length of the backing and the abrasive sheet fastened thereto measured parallel to the axis of the rotor should in general be as great as the effective width of the rotor whereby it is adapted to act on all portions of the blade without requiring shifting of the sharpening device while in use. The sharpener should be sufficiently wide to insure the device being at all times in tangential contact with one or more blades of the rotor when used in the position shown in Figures 6 and 7. The curvature along the edge of the sharpener should be such as to permit engaging the shrubbery bar or cross rod of a lawn mower. In practice it has been found that it is preferable to use rectangles of sheet metal and abrasive coated fabric having a major dimension of 12 to 16" and a minor dimension of 5 to 8". It has also been found advantageous to curve the edge of the rectangle of sheet metal back on itself approximately 180 degrees and at a radius slightly greater than that of the shrubbery bar or cross rod. It has been found that a curve at a radius of approximately 3/8" is sufficient to permit engagement with the usual shrubbery bar of a lawn mower.

When the new device is made according to the present invention the step of curving the sheet metal on itself results in pulling the abrasive coated fabric tight between the two fastened edges and around the curve whereby it smoothly and tightly overlies the sheet metal backing. This method is advantageous in that it permits the establishment of this condition without any special smoothing or tightening operation. This method also binds the edges of the abrasive coated fabric around the curved portion of the sheet metal backing, thus as it were "snubbing" the abrasive fabric and decreasing the likelihood of its being pulled away from the fastened edge by the scraping action of the blade during the sharpening operation. The binding action resulting from stretching the abrasive coated fabric around the curved portion of the metal backing results in substantially all the tension caused by the scraping of the blade across the fabric being taken up by that portion of the fabric lying over the curved portion of the metal backing with the result that substantially no tension from the scraping of the blade is transferred to the edge of the fabric which is clamped down by portion 12 of the metal backing. As a result of this construction and the method by which it is obtained, it is unnecessary to fasten the abrasive coated fabric to the metal backing by any other means such as a coating of glue between the two materials.

The new sharpener is advantageous in that it is composed of relatively cheap material and at the same time is strong and relatively long lasting. The construction shown in Figure 4 is advantageous over that shown in Figure 3 in that it increases the adaptability of the article. For example, referring to the method of sharpening illustrated in Figure 6, when that portion of the abrasive surface in contact with the rotary blade when the device is suspended from the shrubbery bar by one curved portion is worn, the article may be reversed and suspended by the other curved portion to present a fresh abrasive surface to the action of the rotary blades. Furthermore the construction in which both edges are curved enables the operator to use either of the methods shown in Figures 6 and 7 without danger of pulling the abrasive coated fabric from under the clamped portion 12 of the sheet metal. Referring to these figures it will be noted that in the method of Figure 6 the action of the blade 16 tends to pull the abrasive fabric away from the edge of the curved portion which is in engagement with the shrubbery bar, while in the method of Figure 7 the action of the blade tends to pull the abrasive coated fabric from the edge opposite the curved portion in engagement with the shrubbery bar. In using the method of Figure 7 therefore, it is advantageous to have the binding action of the curved portion explained above, at the edge away from the curved edge in engagement with the shrubbery bar. Furthermore, in this method it is advantageous to have a curved edge toward the rear of the bar as it enables the user to easily and safely grasp the sharpener and hold it in proper position. This construction is useful also in the method of Figure 6 because it permits the placing of weights in the unused curved portion.

I claim:

1. A method of making a lawn mower sharpener which comprises forming a rectangle of rigid, non-flexible bendable sheet metal, forming a similar equivalent rectangle of abrasive coated fabric, placing the two said rectangles together with the abrasive surface out whereby they coincide, firmly attaching the two said rectangles along a pair of opposite edges, and curving the said rectangles adjacent and parallel a thus joined edge with the sheet metal inside whereby the said abrasive coated fabric is pulled tight between the attached edges to overlie the said sheet metal closely and smoothly and whereby the bend thus formed is adapted to removably embrace the shrubbery bar of a lawn mower and position the sharpener to contact tangentially the cutting edge of a rotary blade with the abrasive surface.

2. A method of making a lawn mower sharpener which comprises forming a rectangle of rigid, non-flexible bendable sheet metal, forming a similar equivalent rectangle of abrasive coated fabric, placing the two said rectangles together with the abrasive surface out whereby they coincide, bending small portions of the sheet metal back on itself along a pair of opposite edges with the fabric inside and clamping the said portions whereby the two rectangles are firmly attached along the two said edges, and curving the said rectangles adjacent and parallel a thus joined edge with the sheet metal inside whereby the said abrasive coated fabric is pulled tight between the attached edges to overlie the said sheet metal closely and smoothly and whereby the sharpener is adapted to removably embrace the said shrubbery bar and position the sharpener to contact tangentially the cutting edge of a rotary blade with the abrasive surface.

3. A method of making a lawn mower sharpener which comprises forming a rectangle of rigid, non-flexible bendable sheet metal, forming a similar equivalent rectangle of abrasive coated fabric, placing the two said rectangles together with the abrasive surface out whereby they coincide, firmly attaching the two said rectangles along a pair of opposite edges, and curving the said rectangles parallel and adjacent each of the joined edges with the sheet metal inside whereby the said abrasive coated fabric is pulled tight between the attached edges to overlie the said sheet metal closely and smoothly and whereby the bends thus formed are each independently adapted to removably embrace the shrubbery bar of a lawn mower and position the sharpener to contact tangentially the cutting edge of a rotary blade with the abrasive surface.

4. A lawn mower sharpener comprising a rectangle of rigid, non-flexible bendable sheet metal and a similar equivalent rectangle of abrasive coated fabric coincident with and smoothly overlying the rectangle of sheet metal with the abrasive surface out and firmly attached thereto along a pair of opposite edges, the said attached rectangles being curved back on the sheet metal adjacent and parallel an edge of attachment whereby the said abrasive coated fabric is held tightly between the attached edges to overlie the said sheet metal closely and smoothly and whereby the curved portion is adapted to removably embrace the shrubbery bar of a lawn mower and position the sharpener to contact tangentially the cutting edge of a rotor blade with the abrasive surface.

5. A lawn mower sharpener comprising a rectangle of rigid, non-flexible bendable sheet metal and a similar equivalent rectangle of abrasive coated fabric coincident with and smoothly overlying the said rectangle of sheet metal with the abrasive surface out and firmly attached thereto along a pair of opposite edges by portions of the sheet metal which are bent back and clamped down on the said fabric and the body of the sheet metal, the said attached rectangles being curved back on the said sheet metal adjacent and parallel an edge of attachment whereby the said abrasive coated fabric is held tightly between the attached edges to overlie the said sheet metal closely and smoothly and whereby the curved portion is adapted to removably embrace the shrubbery bar of a lawn mower and position the sharpener to contact tangentially the cutting edge of a rotary blade with the abrasive surface.

6. A lawn mower sharpener comprising a rectangle of rigid, non-flexible bendable sheet metal and a similar equivalent rectangle of abrasive coated fabric coincident with and smoothly overlying the rectangle of sheet metal with the abrasive surface out and firmly attached thereto along a pair of opposite edges, the said attached rectangles being curved back on the sheet metal adjacent and parallel the edges of attachment whereby the said abrasive coated fabric is pulled tight between the attached edges to overlie the said sheet metal closely and smoothly and whereby each curved portion is independently adapted to removably embrace the strubbery bar of a lawn mower and position the sharpener to contact tangentially the cutting edge of a rotary blade with the abrasive surface whereby the said sharpener is adapted to be used in a plurality of positions with respect to the shrubbery bar and rotor blades, thereby increasing its useful life.

CLARK R. GARRIS.